(12) United States Patent
Ogura et al.

(10) Patent No.: US 10,418,923 B2
(45) Date of Patent: Sep. 17, 2019

(54) ROTATING MOTION CONTROL APPARATUS, IMAGE FORMING APPARATUS AND METHOD FOR ROTATING MOTION CONTROL

(71) Applicant: KONICA MINOLTA, INC., Chiyoda-ku, Tokyo (JP)

(72) Inventors: Keigo Ogura, Tokyo (JP); Takumi Shirakuma, Tokyo (JP); Yumiko Izumiya, Hachioji (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 15/962,658

(22) Filed: Apr. 25, 2018

(65) Prior Publication Data
US 2018/0342967 A1    Nov. 29, 2018

(30) Foreign Application Priority Data

May 25, 2017    (JP) .................................. 2017-103295

(51) Int. Cl.
| | | |
|---|---|---|
| H02P 8/14 | (2006.01) | |
| H04N 1/047 | (2006.01) | |
| H04N 1/12 | (2006.01) | |
| H04N 1/195 | (2006.01) | |

(52) U.S. Cl.
CPC .............. H02P 8/14 (2013.01); H04N 1/047 (2013.01); H04N 1/12 (2013.01); H04N 1/19515 (2013.01)

(58) Field of Classification Search
CPC ....................................................... H02P 8/14
USPC ................................................. 318/696, 34
See application file for complete search history.

(56) References Cited

U.S. PATENT DOCUMENTS

| | | | | |
|---|---|---|---|---|
| 5,001,640 A | * | 3/1991 | Matsumoto | B60T 8/174 303/165 |
| 6,563,666 B1 | * | 5/2003 | LaPanse | G11B 5/5526 318/560 |
| 7,880,422 B2 | * | 2/2011 | Tsujimoto | G03G 15/06 318/432 |
| 7,999,500 B1 | * | 8/2011 | Ying | G05D 23/275 318/400.04 |

FOREIGN PATENT DOCUMENTS

JP    2004129443 A    4/2004

* cited by examiner

*Primary Examiner* — David Luo
(74) *Attorney, Agent, or Firm* — Holtz, Holtz & Volek PC

(57) ABSTRACT

A rotating motion control apparatus including a memory which stores an index value concerning a rotating speed of a stepping motor; and a hardware processor which determines the rotating speed of the stepping motor and controls operation of a driver which rotates the stepping motor according to the rotating speed; wherein the memory stores an arrangement of a speed index value and an arrangement of an acceleration index value, and the hardware processor controls the operation of the driver by combining a period of determining the rotating speed according to the arrangement of the speed index value and a period of calculating and determining the rotating speed based on the arrangement of the acceleration index value when the rotating speed is altered.

16 Claims, 11 Drawing Sheets

FIG.4A

| ADDRESS | NEXT REFERENCE ADDRESS | PRESCRIBED COUNT |
|---|---|---|
| 0 | 1 | 13332 |
| 1 | 2 | 7659 |
| 2 | 3 | 6114 |
| 3 | 4 | 5176 |
| 4 | 5 | 4570 |
| 5 | 6 | 4136 |
| 6 | 7 | 3806 |
| 7 | 8 | 3545 |
| 8 | 9 | 3330 |
| 9 | 10 | 3151 |
| 10 | 11 | 2997 |
| 11 | 12 | 2865 |
| 12 | 13 | 2748 |
| 13 | 14 | 2644 |
| 14 | 15 | 2552 |
| 15 | 16 | 2468 |
| 16 | 17 | 2392 |
| 17 | 18 | 2323 |
| 18 | 19 | 2259 |

FIG.4B

| ADDRESS | NEXT REFERENCE ADDRESS OFFSET | ACCELERATION SETTING VALUE |
|---|---|---|
| 256 | 1 | 32000 |
| 257 | 2 | 31000 |
| 258 | 3 | 31000 |
| 259 | 4 | 30000 |
| 260 | 5 | 30000 |
| 261 | 6 | 29000 |
| 262 | 7 | 28000 |
| 263 | 8 | 27000 |
| 264 | 9 | 26000 |
| 265 | 10 | 25000 |
| 266 | 11 | 24000 |
| 267 | 12 | 24000 |
| 268 | 13 | 23000 |
| 269 | 14 | 23000 |
| 270 | 15 | 23000 |
| 271 | 16 | 23000 |
| 272 | 17 | 22000 |
| 273 | 18 | 22000 |
| 274 | 19 | 22000 |
| 275 | 20 | 21000 |
| 276 | 21 | 21000 |
| 277 | 22 | 21000 |
| 278 | 23 | 21000 |

FIG.5A

| ACCELERATION/DECELERATION CLASSIFICATION | ACCELERATION |
|---|---|
| INFLECTION POINT | 4 |
| INFLECTION POINT REFERENCE | 262 |
| TARGET COUNT VALUE | 2410 |

FIG.5B

| ACCELERATION/DECELERATION CLASSIFICATION | DECELERATION |
|---|---|
| INITIAL SPEED | 15 |
| INITIAL ACCELERATION | 277 |
| INFLECTION POINT | 262 |
| INFLECTION POINT REFERENCE | 4 |

FIG.6A

| ADDRESS | NEXT REFERENCE ADDRESS | PRESCRIBED COUNT |
|---|---|---|
| 0 | 1 | 13332 |
| 1 | 2 | 7659 |
| 2 | 3 | 6114 |
| 3 | 4 | 5176 |
| 4 | 262 | 4570 |
| 5 | 6 | 4136 |
| 6 | 7 | 3806 |
| 7 | 8 | 3545 |
| 8 | 9 | 3330 |
| 9 | 10 | 3151 |
| 10 | 11 | 2997 |
| 11 | 12 | 2865 |
| 12 | 13 | 2748 |
| 13 | 14 | 2644 |
| 14 | 15 | 2552 |
| 15 | 16 | 2468 |
| 16 | 17 | 2392 |
| 17 | 18 | 2323 |
| 18 | 19 | 2259 |

FIG.6B

| ADDRESS | NEXT REFERENCE ADDRESS | ACCELERATION SET VALUE |
|---|---|---|
| 256 | 0 | 32000 |
| 257 | 256 | 31000 |
| 258 | 257 | 31000 |
| 259 | 258 | 30000 |
| 260 | 259 | 30000 |
| 261 | 260 | 29000 |
| 262 | 4 | 28000 |
| 263 | 262 | 27000 |
| 264 | 263 | 26000 |
| 265 | 264 | 25000 |
| 266 | 265 | 24000 |
| 267 | 266 | 24000 |
| 268 | 267 | 23000 |
| 269 | 268 | 23000 |
| 270 | 269 | 23000 |
| 271 | 270 | 23000 |
| 272 | 271 | 22000 |
| 273 | 272 | 22000 |
| 274 | 273 | 22000 |
| 275 | 274 | 21000 |
| 276 | 275 | 21000 |
| 277 | 276 | 21000 |
| 278 | 277 | 21000 |

FIG.10A

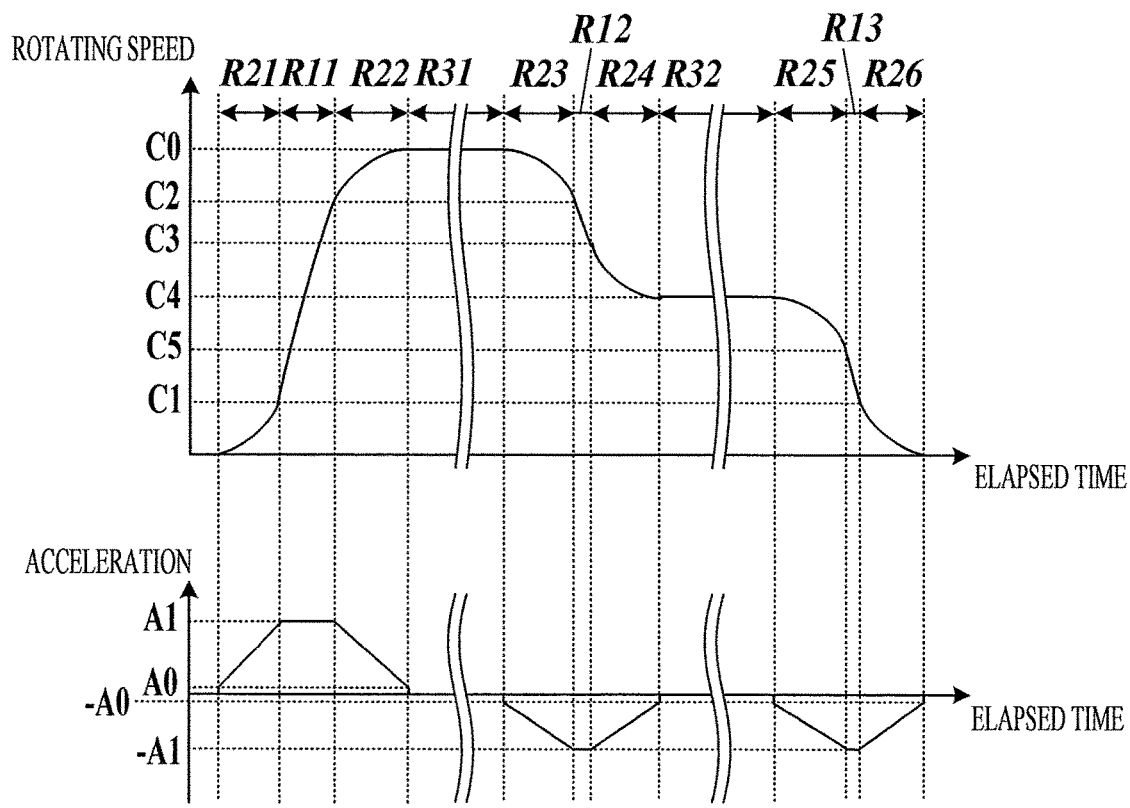

FIG.10B

| ACCELERATION/DECELERATION CLASSIFICATION | ACCELERATION |
|---|---|
| INITIAL ACCELERATION | Addr(A0) |
| TARGET COUNT VALUE | C1 |
| REFERENCE | Addr(C1) |
| INFLECTION POINT | Addr(C2) |
| INFLECTION POINT REFERENCE | Addr(A1) |
| TARGET COUNT VALUE | C0 |

FIG.10C

| ACCELERATION/DECELERATION CLASSIFICATION | DECELERATION |
|---|---|
| INITIAL ACCELERATION | Addr(A0) |
| TARGET COUNT VALUE | C2 |
| REFERENCE | Addr(C2) |
| INFLECTION POINT | Addr(C3) |
| INFLECTION POINT REFERENCE | Addr(A1) |
| TARGET COUNT VALUE | C4 |

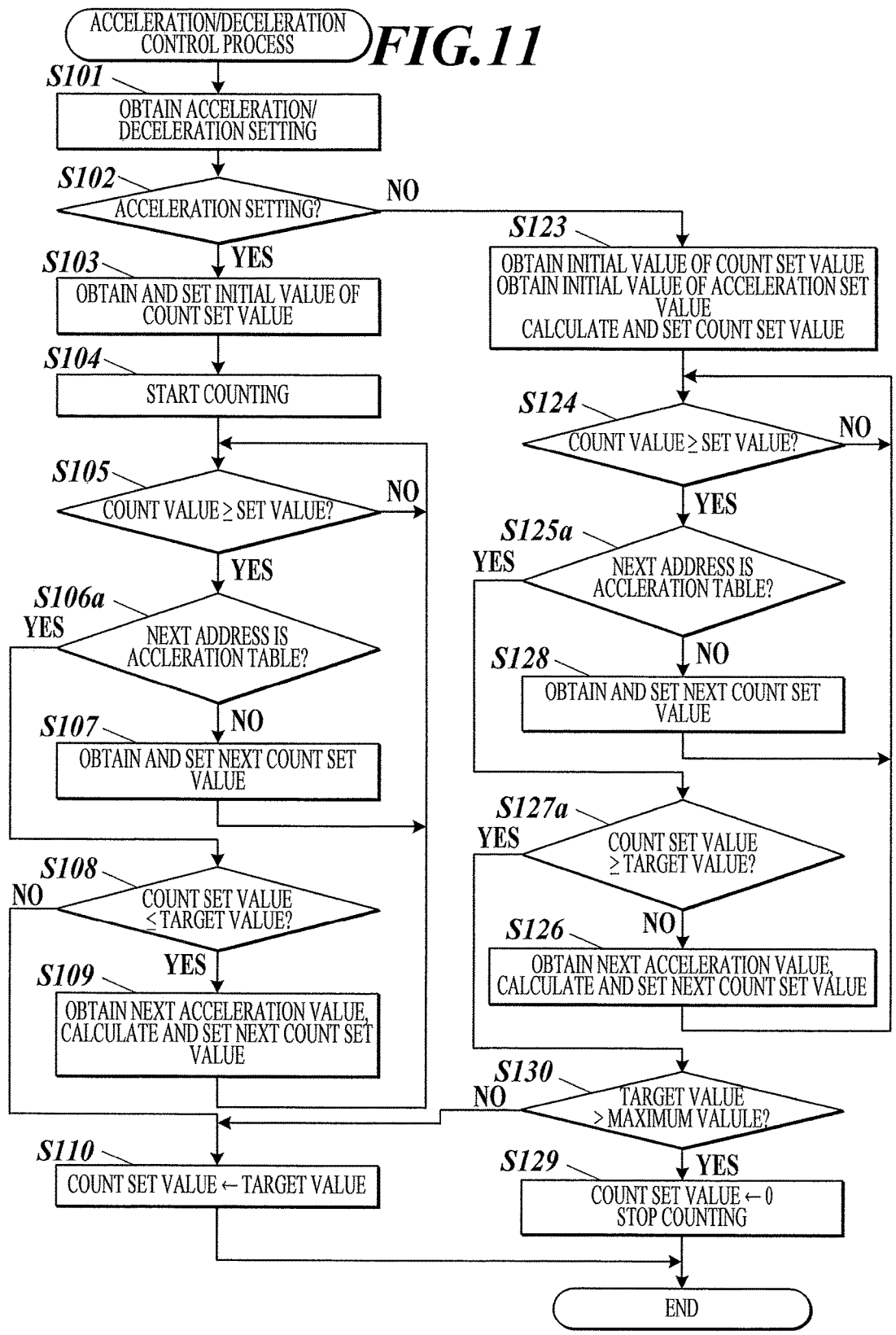

ROTATING MOTION CONTROL APPARATUS, IMAGE FORMING APPARATUS AND METHOD FOR ROTATING MOTION CONTROL

BACKGROUND

1. Technological Field

The present invention relates to a rotating motion control apparatus, an image forming apparatus and a method for rotating motion control.

2. Description of the Related Art

Conventionally there has been a technique in which a material (medium to be conveyed), abutted on the surface of a roller directly or indirectly with a belt, is conveyed as the roller driven by a motor rotates. In this technique, with a stepping motor being used as a motor, the material can be very accurately retained at the position according to the number of stepping motions of the stepping motor, when it is necessary to obtain and control the accurate positions of the material to be conveyed.

However, as a conveyance speed of the material increases, that is, a rotating speed of the stepping motor increases, the change in speed occurs in an abrupt way at a beginning and an ending of rotating motions, and eventually problems like shocking to the roller or belt, and stepping out of the stepping motor arise because of the sudden and massive acceleration at those moments.

To solve such problems as these, there has been a technique which prevents shocking to the medium to be conveyed and stepping out of the stepping motor by controlling the speed alteration more smoothly when the rotating speed of the stepping motor is altered. As to this control, there has been known a technique in which a table showing patterns of speed alterations is prepared and the speed is altered sequentially according to the table (as in Japanese Patent Application Laid Open Publication No. 2004-129443).

The rotating speed of stepping motors alters according to the purpose of use. The necessary positioning accuracy also varies according to the accuracy requirements. It is not efficient to prepare tables individually according to many requirements as these, because it leads to increasing of the required storage size.

SUMMARY

An object of the present invention is to provide a rotating motion control apparatus, an image forming apparatus, and a method for rotating motion control which enable more efficient and accurate rotation control over stepping motors.

To achieve at least one of the abovementioned objects, according to an aspect of the present invention, the rotating motion control apparatus reflecting one aspect of the present invention includes: a memory which stores an index value concerning a rotating speed of a stepping motor; and a hardware processor which determines the rotating speed of the stepping motor and controls operation of a driver which rotates the stepping motor according to the rotating speed; wherein the memory stores an arrangement of a speed index value and an arrangement of an acceleration index value, and the hardware processor controls the operation of the driver by combining a period of determining the rotating speed according to the arrangement of the speed index value and a period of calculating and determining the rotating speed based on the arrangement of the acceleration index value when the rotating speed is altered.

According to another aspect of the present invention, the image forming apparatus reflecting one aspect of the present invention includes: a conveyer including the rotating motion control apparatus described above, the driver, and the stepping motor; and an image forming operator which forms an image on a medium conveyed by the conveyer.

According to another aspect of the present invention, the method for rotating motion control reflecting one aspect of the present invention uses a memory which stores an index value concerning a rotating speed of a stepping motor, determines the rotating speed of the stepping motor and controls operation of a driver which rotates the stepping motor according to the rotating speed, wherein the memory stores an arrangement of a speed index value and an arrangement of an acceleration index value, the method comprising a rotating speed setting step of controlling the operation of the driver by combining a period of determining the rotating speed according to the arrangement of the speed index value and a period of calculating and determining the rotating speed based on the arrangement of the acceleration index value, when the rotating speed is altered.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 4A is a chart showing an example of a speed table;

FIG. 4B is a chart showing an example of an acceleration table;

FIG. 5A is a chart showing an example of the acceleration/deceleration setting in the register;

FIG. 5B is a chart showing an example of the acceleration/deceleration setting in the register;

FIG. 6A is a chart showing an example of rewriting of a speed table;

FIG. 6B is a chart showing an example of rewriting of an acceleration table;

FIG. 10A is a graph showing an example of pattern of alteration of the rotating speed and the acceleration of the stepping motor;

FIG. 10B is a graph showing a partial example of the acceleration/deceleration setting to be set in the register according to the pattern of alteration of the rotating speed and the acceleration of the stepping motor;

FIG. 10C is a graph showing a partial example of the acceleration/deceleration setting to be set in the register according to the pattern of alteration of the rotating speed and the acceleration of the stepping motor; and FIG. 11 is a flow chart showing the control procedure of the acceleration/deceleration control process executed in the image forming apparatus in the third embodiment.

DETAILED DESCRIPTION OF EMBODIMENTS

Embodiments of the present invention are described hereinafter with reference to the drawings. However, the scope of the present invention is not limited to those embodiments.

First Embodiment

Figure 1:
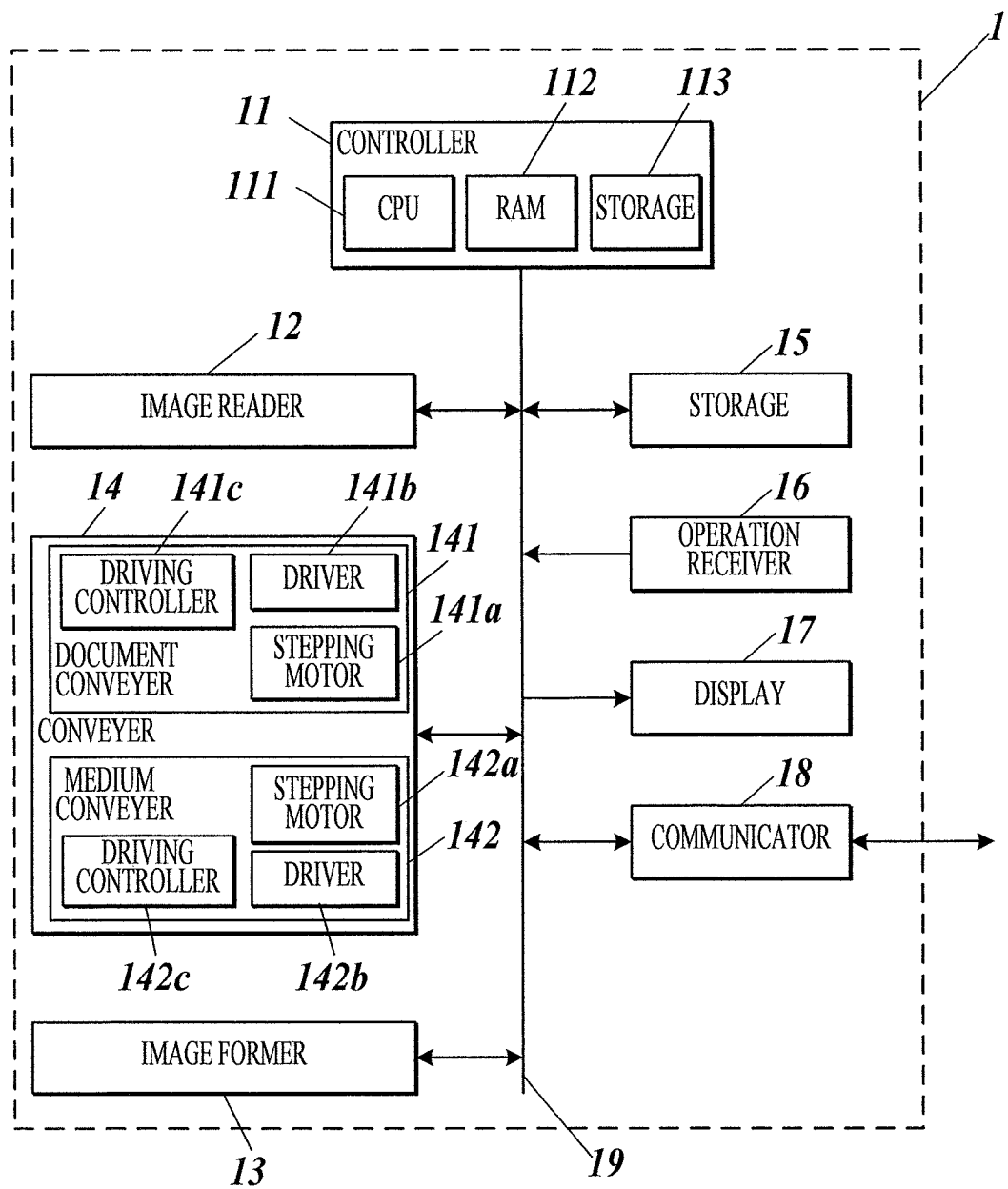
FIG. 1 is a block diagram showing the functional structure of an image forming apparatus in the first embodiment.

FIG. 1 is a block diagram showing the functional structure of the image forming apparatus 1 in the first embodiment, including the embodiment of the rotating motion control apparatus in the present invention.

The image forming apparatus 1 is a multi-function device (MFD) which has functions of scanning, copying and printing. The image forming apparatus 1 includes a controller 11, an image reader 12, an image former 13 (an image forming operator), a conveyer 14, a storage 15, a operation receiver 16, a display 17, a communicator 18, and a bus 19.

The controller 11 controls the whole operation of the image forming apparatus 1, causing each section to operate appropriately. The controller 11 includes a CPU 111, an RAM 112, a storage 113, and so forth. The CPU 111 operates arithmetic processing and various controlling operations. The RAM 112 provides a memory space for operation to the CPU 111.

The storage 113 stores various setting data and programs concerning the controlling operation of the controller 11. The setting data include data which a speed table 1401a and an acceleration table 1401b described later have their basis on. The storage 113 has a reading only memory (ROM) which is capable only of reading out, a non-volatile memory such as a flash memory which is rewritable and updatable, or a combination thereof.

The image reader 12 has an image taker (scanner) and reads a document placed on its reading face to generate image data. The image taker is configured to read a pixel value of three colors, red (R), green (G) and blue (B), for example, and generate image data with a prescribed resolution. The generated image data are stored in the storage 15 or such.

The image former 13 forms an image on a recording medium (such as paper) according to the image data object to be formed. The image former 13 has a configuration of a digital photographing style to form an image on a recording medium by sticking toners of some colors (such as colors cyan (C), magenta (M), yellow (Y) and black (K)), though not limited.

The conveyer 14 conveys documents to be read by the image reader 12 and recording media on which the image of the image data object to be formed is formed by the image former 13 at an appropriate speed and timings.

The conveyer 14 includes a document conveyer 141 to convey documents to be read by the image reader 12 and a medium conveyer 142 to convey recording media on which images are formed by the image former 13. The document conveyer 141 and medium conveyer 142 respectively have stepping motors 141a and 142a, drivers 141b and 142b (motor drivers) which causes the stepping motors to rotate, driving controllers 141c and 142c (rotating motion control apparatus) which respectively control the drivers 141b and 142b, and so forth.

The driver 141b and 142b operate to switch the polarity of voltage to be charged to a stator so that the magnetic field polarity of the stepping motors 141a and 142a is switched per designated unit angle, for example, by 90°. The switching is done according to the driving control signal input from the driving controllers 141c and 142c.

A roller or a conveying belt on which documents and recording media (hereinafter referred to collectively as media to be conveyed) are abutted is rotated or moved by the stepping motors 141a and 142a which rotate according to the driving signal from drivers 141b and 142b. This makes it possible to convey the medium to be conveyed at a speed according to the rotating speed of the stepping motors 141a and 142a. The stepping motors 141a and 142a, the roller and the conveying belt rotated by the stepping motors 141a and 142a are not limited to be single each, and they can be plurally incorporated into any section of the conveying circuit of the media to be conveyed.

The driving controllers 141c and 142c are later described in detail.

The storage 15 stores the memory of the image data object to be formed, the data of the image read by the image reader 12, and so forth. The storage 15 has one or a combination of volatile memories such as DRAM, and storage media such as a hard disk drive (HDD), a solid state drive (SSD), and a flash memory.

The operation receiver 16 includes operation keys, a touch sensor formed integrally with the display 17, and so forth. The operation receiver 16 outputs to the controller 11 an operation signal according to operation of pushing the operation keys and an external touch operation (mainly by user) on the display of the display 17.

The display 17 displays an operation screen, status and so forth, according to the control signal from the controller 11. The display 17 is exemplified by a liquid crystal display (LCD) which uses a dot matrix system for displaying, though not limited.

The communicator 18 is an interface to communicate with a server or such on the network under the command from the controller 11, exemplified by a network interface card, a module for wireless communication via wireless LAN (such as IEEE802.11n). The communicator 18 receives setting data concerning image data to be formed or print jobs from an external device such as a computer or a print server, and outputs a status signal and so forth.

Next explained is a configuration of the conveyer 14 in accordance with the present embodiment.

A configuration of the medium conveyer 142, which can be applied also to the document conveyer 141, is described hereinafter.

Figure 2A:
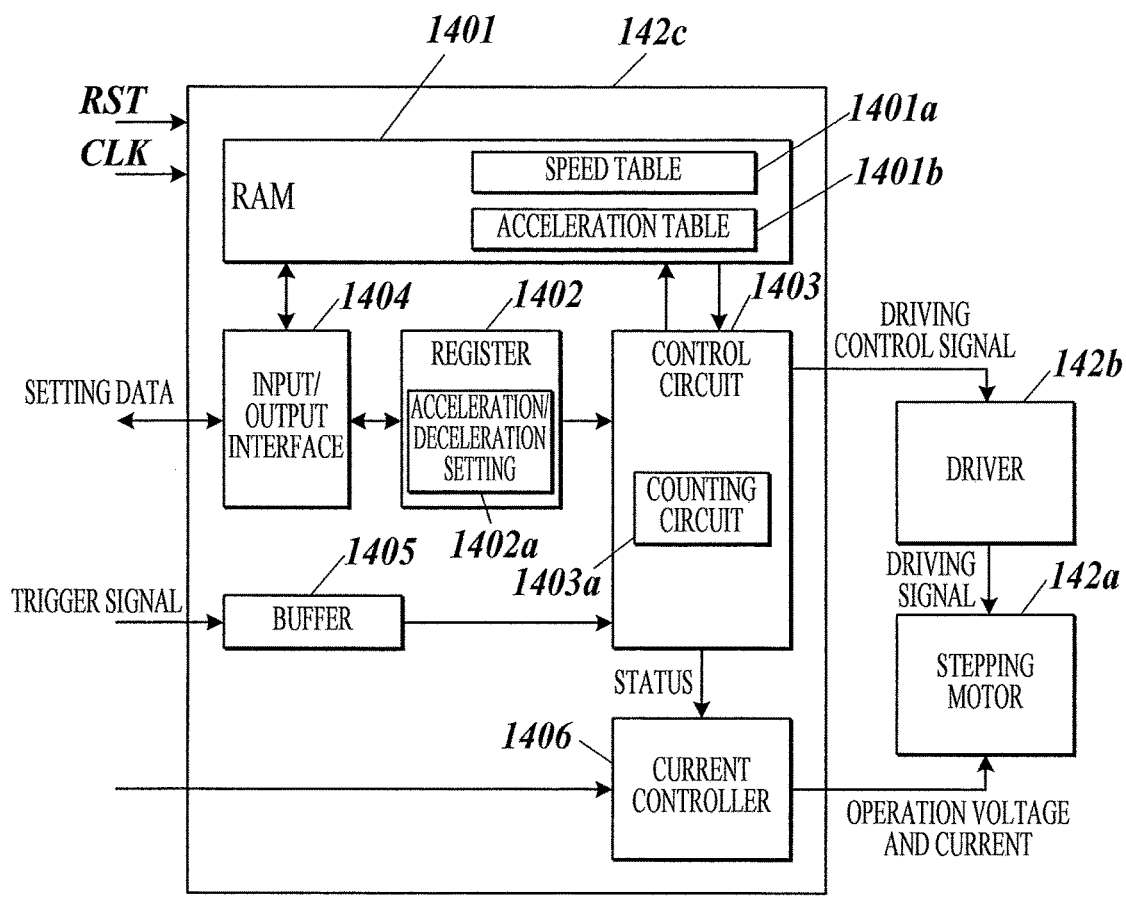
FIG. 2A is a block diagram showing the functional structure of a medium conveying section.
Figure 2B:
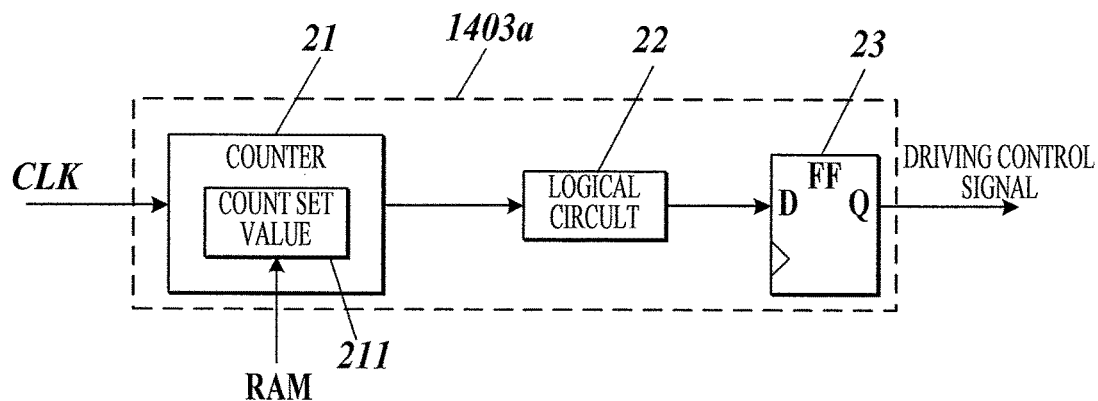
FIG. 2B is a block diagram showing the functional structure of a medium conveying section.

FIGS. 2A and 2B is block diagrams showing a functional structure of the medium conveyer 142.

As shown in FIG. 2A, the driving controller 142c of the medium conveyer 142 incorporates an RAM 1401 (a memory), a register 1402, a control circuit 1403, an input/output interface 1404, a buffer 1405, a current controller 1406, and so forth.

A hardware processor as the driving controller of the rotating motion control apparatus in the embodiments of the present invention includes at least a register 1402 and a control circuit 1403 among those components.

The RAM 1401 stores temporal setting values and so forth. Though an SRAM is used as the RAM 1401 which is capable of reading and writing at a high speed in the present embodiment, a non-volatile memory such as an MRAM and an FeRAM can also be used. In the RAM 1401, a speed table 1401a (arrangement of speed index values) and an acceleration table 1401 (arrangement of acceleration index values) are stored as index values for the rotating speed. The speed table 1401a and the acceleration table 1401b are written by the external controller 11 via the input/output interface 1404. The written speed table 1401a and acceleration table 1401b are referred to and read out by the control circuit 1403, when the rotating speed of the stepping motors 141a and 142a increases or decreases.

The register 1402 stores the setting values concerning the conveyance speed control. The acceleration/deceleration setting 1402a is stored in the register 1402 and is referred to by the control circuit 1403. The writing setting of the acceleration/deceleration setting 1402a is executed by the controller 11 via the input/output interface 1404. The descriptions above on the acceleration/deceleration setting 1402a may be applied to the RAM 1401 with the speed table 1401a and the acceleration table 1401b.

The control circuit 1403 outputs a driving control signal to operate the stepping motor 142a at an appropriate speed based on the speed table 1401a, the acceleration table 1401b and the acceleration/deceleration setting 1402a to the driver 142b. The control circuit 1403 has a counting circuit 1403a (counter circuit) and outputs a driving control signal which switches each time a prescribed count of clock signals at a prescribed frequency is attained. There may be multiple counting circuits 1403a, which are switched alternatively to be used as described later. The control circuit 1403 may execute a controlling operation with a designated hardware circuit (such as ASIC) under the control by the controller 11, or execute a controlling operation as software with an additional CPU or RAM. Both of those controlling operations may be switched alternatively.

The input/output interface 1404 switches and outputs to the RAM 1401 and the register 1402 an input signal from outside of the driving controller 142c, namely from the controller 11 in this embodiment. The setting data of the RAM 1401 and the register 1402 are switched and output to the outside of the driving controller 142c (controller 11). The switching may be done based on a control signal from the controller 11.

The buffer 1405 receives a trigger signal at a starting of conveyance to the control circuit 1403, synchronizes it with a clock signal and outputs it at appropriate timings. This allows the timings of starting conveyance, starting speed alteration, and ending conveyance to be coordinated.

The current controller 1406 outputs to each stator of the stepping motor 142a the supply voltage (power) supplied to the driving controller 142c. The output voltage, after switching to an appropriate cycle and polarity based on the driving signal from the driver 142b, is applied to the stepping motor 142a to generate a current (magnetic field), and eventually rotates the rotor per unit angle (90°). A status signal which indicates whether it is acceleration or deceleration is output from the control circuit 1403 to the current controller 1406 in accelerating or decelerating. In a case where the stepping motor 142a can rotate backwards, the status signal may include the information which indicates whether rotation is forward or backward.

A clock signal at a specific frequency CLK and a reset signal RST are input to the driving controller 142c.

The counting circuit 1403a of the control circuit 1403 has, as shown in FIG. 2B, a counter 21, a logical circuit 22, and a flip-flop circuit 23 (FF).

The counter 21 counts the number of inputs of the clock signals CLK and outputs a prescribed signal to the logical circuit 22 when the counted number (count) reaches the count set value 211. The value counted by the counter 21 is reset and initialized to "0" when the count reaches the count set value 211, and counted from "0" again. The counter 21 may otherwise retain the remainder value after dividing the count number by the count set value 211 and outputs the prescribed signal at timings when the remainder value is back to "0." The description "the value counted by the counter 21 equals the count set value 211" is used hereinafter, including in a case with this configuration.

The logical circuit 22 inverses the logic every time a signal is input from the counter 21 and switches a high level (H) and a low level (L) with each other. The flip-flop circuit 23 is a D-type flip-flop in which the voltage level concerning the output logic from the logical circuit 22 is retained in synchronization with the signal CLK and the driving control signal at the pertinent voltage level is output to the driver 142b. The transition point of the voltage level of the driving control signal is the timing when the driver 142b rotates the stepping motor 142a per unit angle (90°).

The value calculated based on a value read out from the speed table 1401a of the RAM 1401 or a value read out from the acceleration table 1401b is set and stored as the count set value 211 of the counter 21. Thus, the reciprocal of the count set value 211 is the value corresponding to the rotating speed of the stepping motor 142a.

Next, operation of conveying media to be conveyed in the image forming apparatus 1 in accordance with the present embodiment is described.

As described above, in the image forming apparatus 1, the media to be conveyed are conveyed at a speed corresponding to the rotating speed of the stepping motors 141a and 142a. The rotating speed of the stepping motors 141a and 142a may not move immediately from the pausing state to the prescribed speed and vice versa because of the magnitude of the torque, but interpose a period of altering the speed (acceleration and deceleration).

Figure 3A:
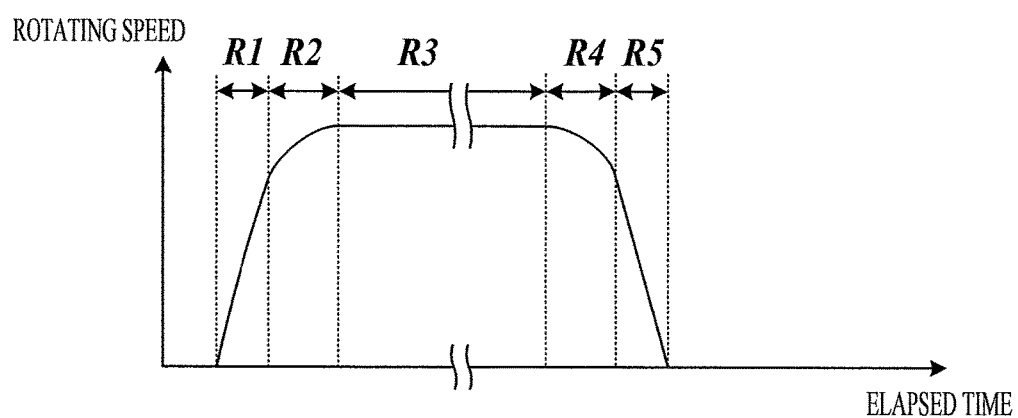
FIG. 3A is a graph showing the speed alteration of a stepping motor of the image forming apparatus.
Figure 3B:
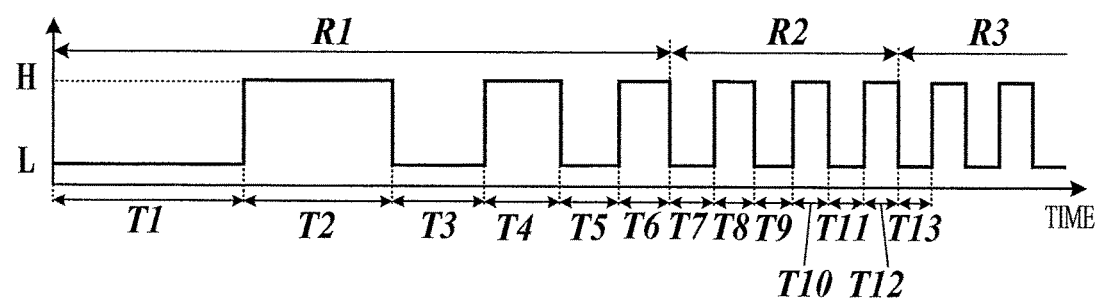
FIG. 3B is a graph showing the speed alteration of a stepping motor of the image forming apparatus.

FIGS. 3A and 3B are graphs showing the speed alteration of the stepping motor 142a in the image forming apparatus 1 in accordance with the present embodiment.

The drawings can be shared with the stepping motor 141a, and the description thereof is omitted.

As shown in FIG. 3A, set in the stepping motor 142a are periods R1 and R2 of accelerating the rotating motion (slow-up) and periods R4 and R5 of decelerating the rotating motion (slow-down) in a period of altering the speed before and after a period R3 of rotating at a constant speed as prescribed. Among these periods, the speed alters at a constant acceleration against time axis (elapsed time) in the periods R1 and R5. The speed alters in the periods R2 and R4 at an acceleration lower at a point of transition to the period R3 than at a respective point of transition to the periods R1 and R5. As described above, the abrupt speed alteration before and after the transition to/from the operation of conveying at a constant speed (equals instantaneous rapid acceleration) is prevented in order to avoid irregularities in the position or the conveying speed of the roller and conveying belt in the conveying operation and the media to be conveyed, and especially excesses of the moving speed at a time of stopping acceleration (overshoots).

As shown in FIG. 3B, a driving control signal output from the control circuit 1403 of the driving controller 142c (flip-flop circuit 23) is a binary signal in a pulse form of square wave moving back and forth between a high level signal H and a low level signal L. At each semi-cycle of the pulse, or each time a signal rises or falls, the driver 142b switches the polarity of the stepping motor 142a (stator) to rotate the rotor per unit angle (90°). The duration of semi-period of the pulse, that is, the count set value 211 described above is set each time, while the rotating speed of the stepping motor 142a alters.

The prescribed counts T1 to T13 are determined for each semi-cycle and the prescribed counts T1 to T6 in the period R1 are determined so that the speed is increased at a constant acceleration. The prescribed counts T7 to T12 in the period R2 are determined so that the speed increases at an acceleration gradually falling to approach the prescribed count T13 asymptotically. The prescribed count T13 is fixed in the period R3.

The counting circuits 1403a may be both a variable counting circuit which determines the count setting for each semi-cycle and an invariable counting circuit which maintains an invariable count in the period R3. For example, one may be a hardware circuit and another a circuit with a software control by the CPU. In that case, switching may be done so that the variable counting circuit is used in the periods R1, R2, R4, and R5 and the invariable counting circuit is used in the period R3. The initial count set value can be updated and respectively set according to the type of recording medium or the recording mode (resolution of image, etc.) even for the invariable counting circuit.

FIG. 4A is a chart showing an example of the speed table 1401a. FIG. 4B is a chart showing an example of the acceleration table 1401b.

As to these tables, multiple types of the speed table 1401a may be employed. For the acceleration table 1401b, just a single table is employed in this embodiment.

The next reference address and the preset count corresponding to an address are stored in the speed table 1401a shown in FIG. 4A. The preset count is determined so that the reciprocal value (speed) against the time axis (accumulated count value from the beginning of counting) increases at a constant rate (i.e. the acceleration be constant). The next reference address indicates the information on the address of the preset count to be read out next to the preset count concerning the present reference address. When the rotating speed is increased from the pausing state in the stepping motor 142a (period R1), the preset count corresponding to the address shown as the next reference address of the address "0" (i.e. in an order incrementing from address "0") is read out by turns and is set as the count set value. When the rotating speed is decreased from the prescribed rotating speed in the stepping motor 142a (period R5), the next reference address is set to the previous address, and the preset count is read out in an order decrementing from the maximum address. The speed table 1401a is here used in the period when the acceleration is constant among the periods when the rotating speed is altered.

In a case where various types of speed tables are prepared, the constant rates, namely the accelerations are determined to be different from each other (according to the multiple acceleration set values). Otherwise, the speed tables may be stored in the storage 113 and just a single table necessary may be set as the speed table 1401a to be written in the RAM 1401.

The next reference address offset and the acceleration set value each corresponding to the address are stored in the acceleration table 1401b shown in FIG. 4B. In the periods R2 and R4 (period of altering the acceleration, either or both of the prescribed period from the beginning of the period of altering the rotating speed and the prescribed period before its ending), the next count set value is determined by calculation of the next speed using the acceleration set value corresponding to the initial speed. The acceleration set value may be the value decided according to the acceleration value, not to the count. The value of next reference address offset may be a relative address in the acceleration table 1401b or an absolute address (physical address, "256" in this example) (see FIG. 6B). The count of acceleration stored here is an absolute value. The process where the count set value is decreased and increased in accelerating and decelerating respectively is executed by the control circuit 1403.

FIGS. 5A and 5B are charts showing an example of the acceleration/deceleration setting 1402a set in the register 1402.

FIG. 5A is a setting used when the stepping motor 142a accelerates from the pausing state, and FIG. 5B is a setting used when the stepping motor 142a decelerates from the constant speed rotating state.

Those settings may not only be executed separately to the register 1402, but also be read and set to the register 1402 by the controller 11 collectively when the type of recording medium or the recording mode of an image object to be formed is set.

As shown in FIG. 5A, the acceleration/deceleration setting 1402a has a classification of acceleration/deceleration which, in a setting for acceleration, indicates that it is used for "acceleration". (Actually, whichever classification of binary value determined beforehand is possible.) In this setting for acceleration, stored is an address which indicates the timing of switching from the speed setting of a constant speed using the speed table 1401a (period R1) to the speed setting using the acceleration table 1401b (period R2) (inflection point), an address which indicates the acceleration value used first in switching to the speed setting using the acceleration table 1401b (inflection point reference), and a target count value which indicates the speed to be attained with the speed setting using the acceleration table 1401b (count set value of period R3; prescribed target speed).

The inflection point address is regularly determined according to the target count value. A fixed acceleration alteration from the prescribed count value (initial value) of an arbitrary inflection point address, which means that the speed alteration according to the acceleration set value of the common range in the single acceleration table 1401b, enables an asymptotic approach to the target count value corresponding to the inflection point address. As an initial acceleration, namely an address of inflection point reference (range used for calculating the rotating speed), is determined respectively for multiple speed tables corresponding to multiple accelerations (acceleration set values), the speed is altered according to the acceleration set values in the appropriate range with the single acceleration table 1401b, and the target count value can be approached asymptotically.

In accelerating, the prescribed count value is read out in an order from the address "0" in the speed table 1401a and is set as the count set value. If counting is done corresponding to the prescribed count of the address indicating the inflection point, the acceleration set value of the address of inflection point reference is referred to, and a new count set value is calculated and set by executing operation to decrease the present count set value using the acceleration set value. After this count set value is counted, the count set value is updated over and over as the next acceleration set value is further referred to. When the count set value gets below the target count value (target speed attained), the target count value is set as the count set value and the acceleration (the period of altering the speed, in this example the period of altering the acceleration also) ends.

On the other hand, as shown in FIG. 5B, the acceleration/deceleration setting 1402*a* has a classification of acceleration/deceleration which indicates that it is used for "deceleration" in a setting for deceleration. In the setting for deceleration, stored is an initial speed setting, an initial acceleration address in the acceleration table 1401*b*, an address which indicates the timing of switching from the speed setting using the acceleration table 1401*b* in a asymptotic acceleration (<0) (period R4) to the speed setting at a constant acceleration (period R5) (inflection point), and an address which indicates the speed value (inflection point reference) used first in switching to the speed setting using the speed table 1401*a*. The initial acceleration address may be fixed (for example, in "280"). In that case, this value (address) does not need to be stored in the register 1402. The initial speed is paired to the address of inflection point reference corresponding to the speed in the period R3, and is used for storing the setting in the acceleration/deceleration setting 1402*a* of the register 1402.

In decelerating, the acceleration set value of the initial acceleration address is referred to from the acceleration table 1401*b*, and the next count set value is calculated and set based on the acceleration set value and the present speed (count set value). When the count set value is counted in the counting circuit 1403*a*, the count set value is updated over and over until the address attains the inflection point, decrementing one by one the address to obtain the acceleration set value according to the value of the next reference address offset. After the count set value based on the acceleration set value according to the address of the inflection point, the prescribed count of the inflection point reference is obtained from the speed table 1401*a* and is set as the count set value. When the count set value is counted, the address of the speed table 1401*a* is decremented one by one. When the count set value "13332" of the address "0" is counted and a driving control signal is output, the stepping motor 142*a* is set to the pausing state and the operation control ends.

In the image forming apparatus 1 in accordance with the present embodiment, when increasing or decreasing the rotating speed of the stepping motor 142*a*, that is, when the rotating speed is altered, the operation of the driver 142*b* is controlled, combining the period in which the rotating speed is determined according to the arrangement of the predetermined count of the speed table 1401*a* and the period in which the rotating speed is determined by calculation based on the arrangement of the acceleration set value of the acceleration table 1401*b*.

When the calculated rotating speed (count set value) exceeds the target speed (target count value) (including when the former rotating speed and the calculated rotating speed get to have the target speed therebetween in either of decreasing and increasing directions), the final rotating speed is set to the target speed and the control operation concerning the speed alteration ends.

In accelerating and decelerating, the speed table 1401*a* and the acceleration table 1401*b* are used commonly and the arrangement data (prescribed count and acceleration set value) in each table are read out in a reverse order.

In the image forming apparatus 1, the next reference address is determined not only by comparing the address of inflection point of the acceleration/deceleration setting 1402*a* of the register 1402 and the actual reference address, but also by modifying the next reference address itself according to the acceleration/deceleration setting 1402*a*.

FIG. 6A is a chart showing an example of rewriting of the speed table 1401*a*. FIG. 6B is a chart showing an example of rewriting of the acceleration table 1401*b*.

As shown in FIG. 6A, in the speed table 1401*a* used in accelerating, the address "262" in the acceleration table 1401B can be set directly as the next reference address of the address "4." As shown in FIG. 6B, in the acceleration table 1401*b* used in decelerating, the address "4" in the speed table 1401*a* can be set directly as the next reference address of the address "262". By setting the next reference address as described above, the load of determination process in obtaining and calculating the count set value in the operation of acceleration/deceleration can be reduced.

In those cases, the control circuit 1403 can retain the modified address information separately in the RAM 1401 and be prepared for initialization. The controller 11 can rewrite the former data in the storage 113 for the initialization to be executed. The next reference address can be rewritten directly by the controller 11 when the settings of the register 1402, the RAM 1401, etc. are written, or by the control circuit 1403 according to the acceleration/deceleration setting 1402*a* of the register 1402.

Figure 7:
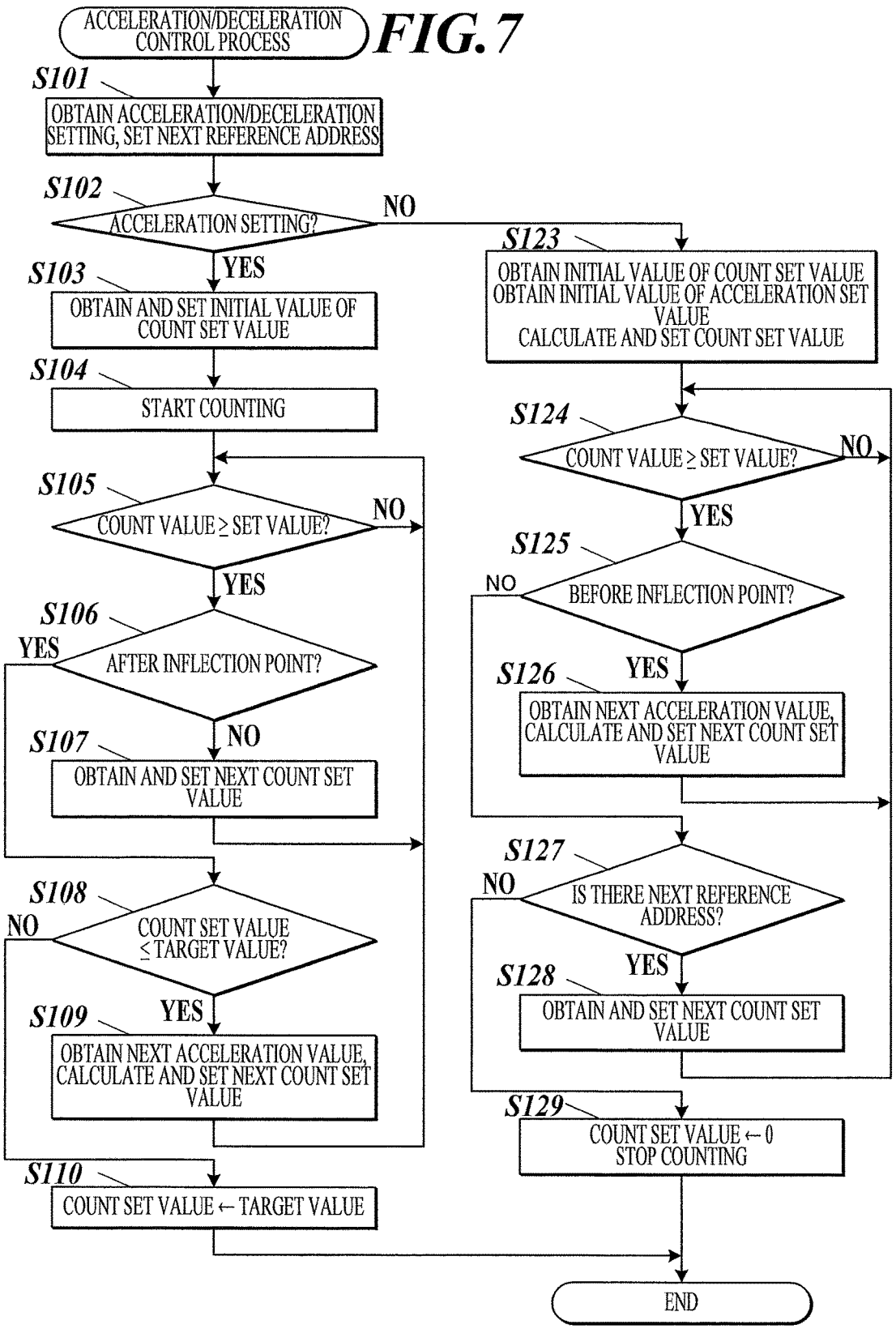
FIG. 7 is a flow chart showing the control procedure of the acceleration/deceleration control process executed in the image forming apparatus.

FIG. 7 is a flow chart showing the control procedure of the acceleration/deceleration control process executed in the image forming apparatus 1 in the present embodiment.

The acceleration/deceleration control process as a method for rotating motion control in the embodiment of the present invention starts by inputting a command to start via the input/output interface 1404 to the control circuit 1403, that is, a command of accelerating (start operation) or decelerating (stop operation) the stepping motor 142*a*, under the control of the controller 11.

When the acceleration/deceleration control process starts, the control circuit 1403 obtains the acceleration/deceleration setting 1402*a* set in the register 1402 by the controller 11 (Step S101). The control circuit 1403 sets the next reference address (next reference address offset) of the speed table 1401*a* and the acceleration table 1401*b* based on the acceleration/deceleration setting 1402*a*, according to the configuration of the driving controller 142*c* and the necessity. The control circuit 1403 determines whether the classification of acceleration/deceleration in the setting is acceleration or not (S102). If it is determined that the setting is classified as acceleration ("YES" in step S102), the control circuit 1403 obtains as the initial value the prescribed count corresponding to the address "0" ("13332") referring to the speed table 1401*a*, and sets it as the count set value 211 of the counting circuit 1403*a* (step S103).

The control circuit 1403 starts the counting operation by the counter 21 (step S104). The counter 21 determines whether or not the counted value (count value) is equal to or more than the count set value 211 (step S105). If the count value is not equal to or larger than the count set value 211 ("NO" in step S105), the process of the step S105 is repeated for each counting operation.

If it is determined that the count value is equal to or larger than the count set value 211 ("YES" in step S105), a control signal is output from the counter 21 to the logical circuit 22 and the driving control signal output from the control circuit 1403 switches. The count value is then reset to "0." The control circuit 1403 determines whether the operation of referring the speed table 1401*a* or the acceleration table 1401*b* is past the inflection point, that is, whether the next reference address is an address in the acceleration table 1401*b* (step S106). If it is determined that the referring operation is not past the inflection point ("NO" in step S106), the control circuit 1403 refers to the data of the next reference address in the speed table 1401*a* to obtain a prescribed count, and sets it as the count set value 211 (step S107). The process of the control circuit 1403 returns to the step S105.

If it is determined that the referring operation is past the inflection point ("YES" in step S106), whether or not the present count set value 211 is equal to or smaller than the target count value is determined (step S108). If it is determined that the count set value 211 is not equal to or smaller than the target count value ("NO" in step S108), the control circuit 1403 obtains the acceleration set value referring to the acceleration table 1401*b*. The control circuit 1403 calculates a new count set value 211 from the present count set value 211 and the acceleration set value obtained and sets it to the counter 21 (step S109). The process of the control circuit 1403 returns to the step S105.

If it is determined that the count set value 211 is equal to or smaller than the target count value in the determining process of the step S108 ("YES" in step S108), the control circuit 1403 sets the target value as the count set value 211 to the counter 21 (step S110). The control circuit 1403 ends the acceleration/deceleration control process. After this process, the driving control signal of the stepping motor 142*a* at a constant speed according to the count set value set as the target value is output from the control circuit 1403.

On the other hand, if the determining process of the step S102 determines the setting is not for acceleration, that is, the classification of acceleration/deceleration is deceleration ("NO" in step S102), the control circuit 1403 obtains the prescribed count of the initial speed address referring to the speed table 1401*a* and the acceleration set value of the initial acceleration address referring to the acceleration table 1401*b*. The control circuit 1403 calculates the next count set value 211 by applying the acceleration set value to the prescribed count, and sets it to the counter 21 (step S123). When the deceleration starts, the count set value 211 is already set and the stepping motor 142*a* is in a constant speed rotating motion or in accelerating. The next count set value 211 may be calculated and set not by obtaining the prescribed count of the initial speed address but by directly applying the acceleration set value to the present count set value 211.

The control circuit 1403 determines whether or not the count value is equal to or larger than the count set value 211 (step S124). If it is determined that the count value is not equal to or larger than the count set value 211 ("NO" in step S124), the control circuit 1403 repeats the process of the step S124 each time the clock signal is counted and the count value varies.

If it is determined that the count value is equal to or larger than the count set value 211 ("YES" in step S124), a control signal is output to from the counter 21 to the logical circuit 22 and the driving control signal output from the control circuit 1403 switches. The count value is reset. The control circuit 1403 determines whether the operation of referring the speed table 1401*a* or the acceleration table 1401*b* is prior to the inflection point, that is, whether the next reference address is an address in the acceleration table 1401*b* (step S125). If it is determined that the referring operation is prior to the inflection point ("YES" in step S125), the control circuit 1403 refers to the next reference address offset in the acceleration table 1401*b* to obtain a new acceleration set value, calculates the next count set value 211 using the acceleration set value and the count set value 211 and sets it to the counter 21 (step S126). The process of the control circuit 1403 returns to the step S124.

If the determining process of the step S125 determines that the referring operation is not prior to the inflection point (after the inflection point) ("NO" in step S125), the control circuit 1403 determines whether the next reference address exists (or whether the present reference address is "0") (step S127). If it is determined that the next reference address exists ("YES" in step S127), the control circuit 1403 refers to the speed table 1401*a* to obtain the prescribed count shown in the next reference address, and sets it as the count set value 211 to the counter 21 (step S128). The process of the control circuit 1403 returns to the step S124.

If the next reference address does not exist ("NO" in step S127), the control circuit 1403 sets "0" as the count set value 211 and stops the counting operation of the counter 21 (step S129). The control circuit 1403 then ends the acceleration/deceleration control process, being in a state where the rotating motion of the stepping motor 142*a* is being stopped.

As described above, the driving controllers 141*c* and 142*c* in the image forming apparatus 1 of the first embodiment is provided with the RAM 1401 which stores the prescribed count concerning the rotating speed of the stepping motors 141*a* and 142*a* and the control circuit 1403 (and the register 1402) which controls the operation of the drivers 141*b* and 142*b* which rotates the stepping motors 141*a* and 142*a* according to the rotating speed by determining the rotating speed of the stepping motors 141*a* and 142*a*. The speed table 1401*a* and the acceleration table 1401*b* are stored in the RAM 1401, and the control circuit 1403 controls the operation of the drivers 141*b* and 142*b* by combining the period determining the rotating speed according to the arrangement of the predetermined counts in the speed table 1401*a* and the period calculating the rotating speed based on the arrangement of the acceleration set values in the acceleration table 1401*b* in a case where the rotating speed is altered.

As the limitation of calculation period and the use of a common acceleration table decrease the amount of calculation and the use of speed table in the regular speed alteration facilitates the process, there can be a variety of speed alterations while the increase in memory size is restrained. The configuration and control described above can improve appropriately the operation accuracy at a time of speed alterations.

The arrangement of the acceleration set values in the acceleration table 1401*b* is commonly used to calculate the rotating speed with an arbitrary rotating speed being set as an initial speed.

As it is not necessary to prepare more than one acceleration table and the acceleration set values may be shared where the acceleration is equal, it is possible to restrain the increase in memory size and simplify the process of various speed alteration patterns.

The RAM 1401 (and/or the storage 113) stores the speed tables 1401*a* concerning the arrangement of prescribed counts in multiple types corresponding to the multiple acceleration set values, and the control circuit 1403 determines a range respectively in the arrangements of acceleration set values to be used in calculating the rotating speed according to the acceleration set value.

The inflection point reference address may be used to set the range of use of the acceleration set values transition from/to a constant speed according to the magnitude of acceleration set in increasing and decreasing the rotating speed. It may facilitate the setting process and actual operation concerning acceleration/deceleration.

The arrangement of the prescribed counts in the speed table 1401*a* is used in the period when the acceleration is constant among the periods when the rotating speed is altered. By tabulating the prescribed counts which have invariable tendency of alteration throughout each section of the speed alterations, the load of processing can be reduced efficiently without much increase in the data amount to be stored in the memory.

The arrangement of acceleration set values in the acceleration table 1401b is used in the period when the acceleration is altered among the periods when the rotating speed is altered. Where the arrangement of speed values is altered regarding each section of acceleration alterations, the data amount to be retained as the speed tables may be reduced by calculating the rotating speed based on the initial value of rotating speed and the acceleration set value. As the speed is calculated by operation only in such a section as this, the load is not increased unnecessarily.

The period of altering the acceleration is individually set in at least one of a prescribed period after a beginning and a prescribed period before an ending of the period of altering the rotating speed. As described above, when the acceleration is altered between the section without acceleration and the section with acceleration, the rollers and belts are prevented from an abrupt speed alteration, that is, a sudden and massive acceleration (massive power), and a shocking to them can be efficiently restrained.

The control circuit 1403 ends the period of altering the acceleration, if the rotating speed (count set value) sequentially calculated in the period of altering the acceleration reaches the predetermined target value (target count value). In a case the speed is calculated from the various initial values of speed using the acceleration set values, the end of the period of altering the acceleration may be easily determined from whether or not the target speed is attained, because the calculated speed value does not always equal the prescribed count.

The control circuit 1403 sets the calculated rotating speed as the target speed when the calculated rotating speed (count set value) exceeds the prescribed target speed (target count value) because of the gap from the previous rotating speed. As described above, the calculated value often differs from the ultimate target speed. The stepping motors 141a and 142a can be rotated accurately at a desirable rotating speed by resetting the ultimate speed as the target speed itself.

The control circuit 1403 uses commonly each of the arrangement of the prescribed counts in the speed table 1401a and the arrangement of the acceleration set values in the acceleration table 1401b in increasing and decreasing the rotating speed, and reverses the order to read out each of the elements in the arrangements. The increase in memory size can be restrained more as the common table data are used in accelerating and in the decelerating.

The prescribed count, which is a speed index value, is the count of clock signals at a prescribed frequency. The control circuit 1403 rotates the stepping motors 141a and 142a per unit angle (90°) by the drivers 141b and 142b, every time the input count of clock signals hits the count indicated by the prescribed count.

As the operation of the stepping motors 141a and 142a is controlled based on the clock signal as described above, the rotating motion of the stepping motors 141a and 142a can be easily maintained at an accurate speed.

In the period of altering the rotating speed, the prescribed count and the acceleration set value are stored in the RAM 1401, so as to be associated with the next reference address indicating the memory location of the prescribed count or the acceleration set value to be read out next to the present prescribed count or the acceleration set value.

This makes it easy to read out the next prescribed count and the acceleration set value based just on the next reference address information in the operation of reading out. Therefore these values can be stably obtained without a huge load especially in high-speed read out to set and control the rotating speed of the stepping motors 141a and 142a.

The image forming apparatus 1 in the present embodiment has a conveyer 14 including the driving controllers 141c and 142c, the drivers 141b and 142b, and the stepping motors 141a and 142a, and an image former 13 which forms an image to the medium conveyed by the conveyer 14.

In accordance with the image forming apparatus 1 as described, the stable feeding operation is possible without adding a sudden and massive power to the rollers and belts at the beginning and ending of conveying the media to be conveyed. Thus, the media to be conveyed may be conveyed stably in an accurate position without much increase in memory size. This makes it possible then to read documents and form images to the recording media accurately.

The rotating motion control method of the stepping motor in the present embodiment, in which the speed table 1401a which is the arrangement of the prescribed counts and the acceleration table 1401b which is the arrangement of the acceleration set values are stored in the RAM 1401, includes a rotating speed setting step to control the operation of the drivers 141b and 142b by combining the period of determining the rotating speed according to the arrangement of prescribed counts and the period of calculating and determining the rotating speed based on the arrangement of the acceleration set values, in altering the rotating speed.

With such a rotating motion control method as this, the amount of calculation is decreased because of the limitation of the period of calculating and the use of the common acceleration table, and the process is facilitated by the use of the speed table in the regular speed alteration part, a variety of speed alterations are possible with the increase in memory size being restrained. It can improve appropriately the accuracy of operation in altering the speed.

The Second Embodiment

Next, the image forming apparatus in accordance with the second embodiment is described.

The configuration of the image forming apparatus 1 in the second embodiment is common to the image forming apparatus in the first embodiment, and the description thereof is omitted, while the numbering in the drawings is shared.

Next, operation of conveying media to be conveyed in the image forming apparatus 1 in accordance with the second embodiment is described.

Figure 8:
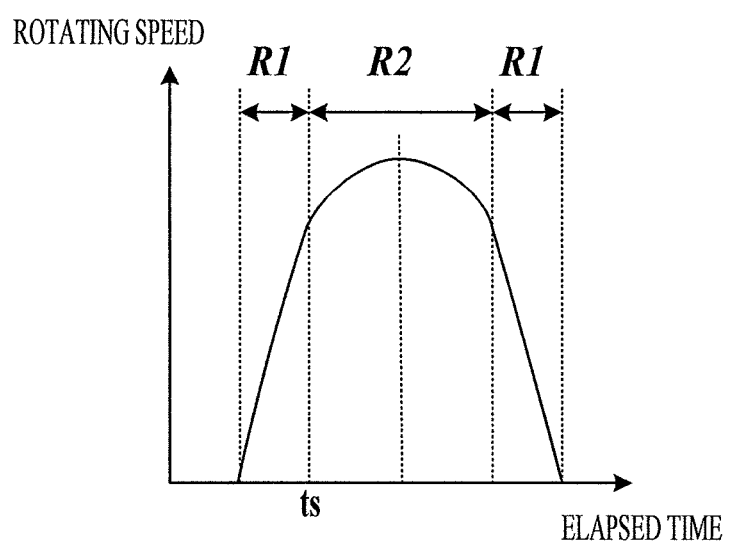
FIG. 8 is a graph showing alteration in the rotating speed in a case where a command to suspend the rotating motion is obtained while the rotating speed of the stepping motor is increasing.

FIG. 8 is a graph showing alteration in the rotating speed of the stepping motors 141a and 142a in a case where a command to pause the conveyance (rotating motion) is obtained at the time of starting to convey the media to be conveyed (recording media), that is, while the rotating speed of the stepping motors 141a and 142a is increasing.

In the image forming apparatus 1, when a command to stop conveying at a timing is while the rotating speed of the stepping motors 141a and 142a is increasing, the speed is not reduced immediately but the acceleration is reduced gradually, and the speed alteration shifts from increase through 0 to decrease in continuation. After the prescribed acceleration (<0) is attained, the speed is reduced to "0" at a constant acceleration.

In this case, the continuous shift from accelerating to decelerating makes it necessary to rewrite the next reference address quickly. Alternatively, the next reference address for acceleration and the next reference address for deceleration may be set individually. As described above, it is possible to determine sequentially the next reference address without using the setting data of the next reference address and execute the process.

A command to pause conveying is, for example, made by a user operation received via the operation receiver 16, or by an interrupting signal input via the input/output interface 1404 in a case of detection of error in supply of the media to be conveyed or in conveyance status by the sensor not shown in the drawings.

Figure 9:
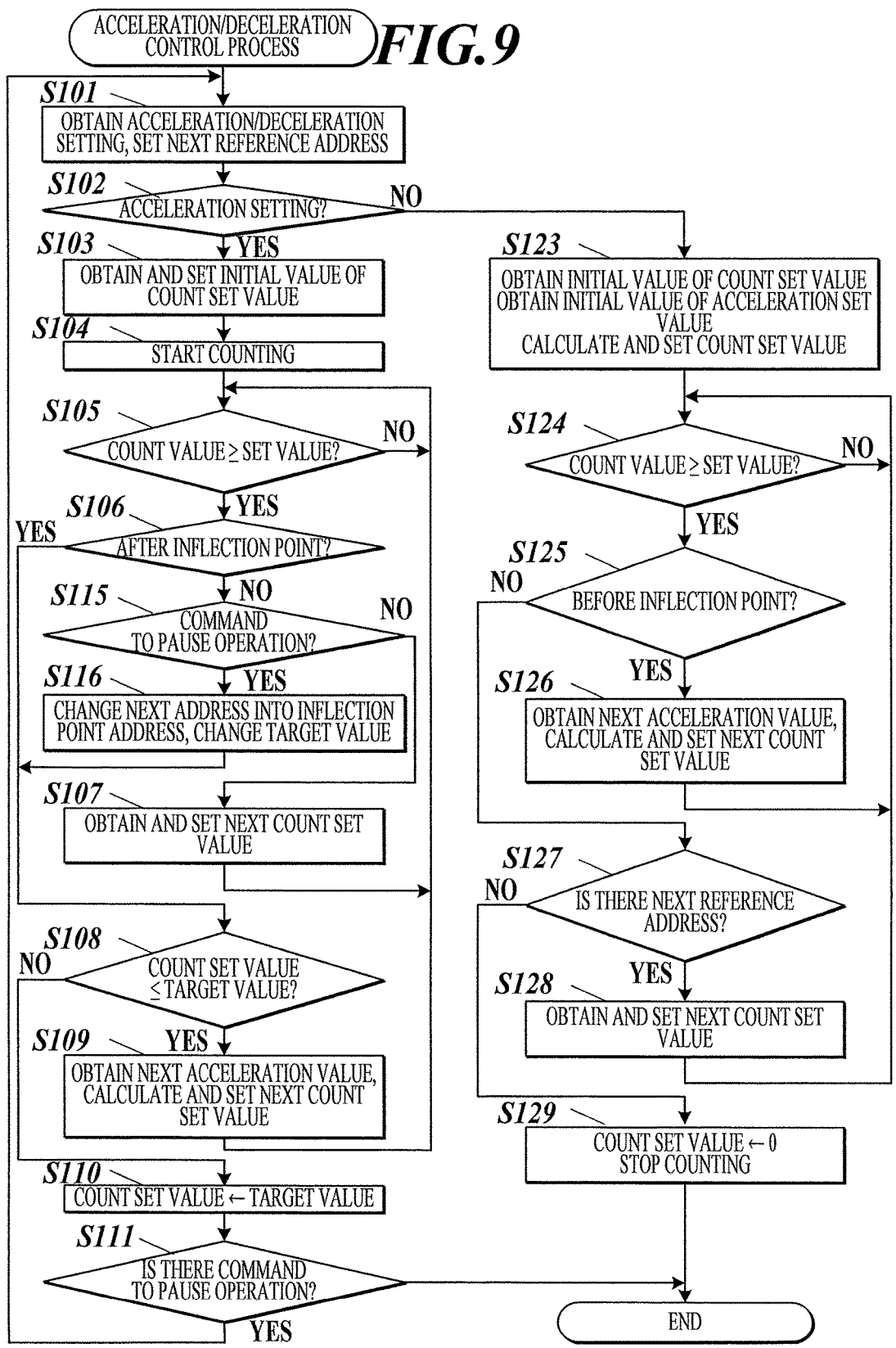
FIG. 9 is a flow chart showing the control procedure of the acceleration/deceleration control process executed in the image forming apparatus in the second embodiment.

FIG. 9 is a flow chart showing the control procedure of the acceleration/deceleration control process executed in the image forming apparatus 1 in the present embodiment.

In comparison to the acceleration/deceleration control process in the first embodiment, the steps S111, S115 and S116 are added to this acceleration/deceleration process. The processing steps other than those are common, and the description thereof is omitted, while the numbering in the drawings is shared.

If the determining process of the step S106 determines that the operation of referring the table is not after the inflection point (but reference to the speed table 1401a) ("NO" in step S106), the control circuit 1403 determines whether a command to pause the conveying operation (rotation motion of the stepping motor 141a or 142a) is obtained (step S115). If it is determined that the command is not obtained ("NO" in step S115), the process of the control circuit 1403 moves on to the step S107.

If it is determined that the command to pause the conveying operation ("YES" in step S115), the control circuit 1403 changes the next reference address into the inflection point address, that is, the acceleration table 1401b. The determined target count value is changed into the value according to the present rotating speed (step S116). The process of the control circuit 1403 then returns to the step S108.

After the process of the step S110, the control circuit 1403 determines whether the command to pause the conveying operation (rotating motion of the stepping motor 141a or 142a) is obtained (step S111). If it is determined that the command is not obtained ("NO" in step S111), the control circuit 1403 ends the acceleration/deceleration control process.

If it is determined that the command to pause the conveying operation ("YES" in step S111), the process of control circuit 1403 moves on to the step S101 and then obtains the setting concerning deceleration.

As described above, in the image forming apparatus 1 in the second embodiment, if the command to pause the rotating motion of the stepping motors 141a and 142a is obtained while the rotating speed is increasing, the rotating speed is decreased (deceleration), after the acceleration of rotating speed is gradually reduced using the arrangement of the acceleration set values and the rotating speed alteration reaches zero. The rotating speed of the stepping motors 141a and 142a is not drastically altered even when the operation of conveying is paused. The problems like stepping out of the stepping motors 141a and 142a are restrained and the location of the media to be conveyed can be easily obtained at the time of restarting the operation.

Third Embodiment

Next, the image forming apparatus in accordance with the third embodiment is described. The configuration of the image forming apparatus 1 in the third embodiment is common to the image forming apparatus in the first embodiment, and the description thereof is omitted, while the numbering in the drawings is shared. In the image forming apparatus 1 in the present embodiment, the obtainer in the image forming apparatus 1 in the present embodiment (driving controllers 141c and 142c as rotating motion control apparatus) is configured with the register 1402 and the control circuit 1403.

Next, operation of conveying media to be conveyed in the image forming apparatus 1 in accordance with the third embodiment is described.

FIG. 10A is a graph showing an example of pattern of alteration of the rotating speed and the acceleration of the stepping motors 141a and 142a. FIGS. 10B and IOC are partial examples of the acceleration/deceleration setting 1402a to be set in the register 1402 according to the pattern of alteration of the rotating speed and the acceleration.

As shown in FIG. 10A, the acceleration alteration is approximately continuous in moving from the pausing state to the starting of acceleration and from deceleration to the pausing state in the stepping motors 141a and 142a of the image forming apparatus 1 in the present embodiment. The rotating speed is variable not only from the pausing state to the prescribed constant speed but also among multiple conveyance speeds. As an immense power (torque) is prevented from being applied to the stepping motors 141a and 142a, in the rotating motion of the stepping motors 141a and 142a, not only shocking to the roller or belt in conveying but also stepping out of the stepping motors 141a and 142a is effectively restrained. This makes it possible to certainly and accurately obtain locations.

The period of increasing the rotating speed includes a period R21 of increasing acceleration (speed "0" to C1, acceleration A0 to A1), a period R11 of rotating at a constant acceleration (speed C1 to C2, acceleration A1), and a period R22 of decreasing acceleration (speed C2 to C0, acceleration A0 to A0), and the accelerating operation during those periods allows a transition to a period R31 of rotating at a constant speed C0 without significant speed alterations. The period of decreasing the rotating speed includes a period R23 of decreasing acceleration (speed C0 to C2, acceleration −A0 to −A1), a period R12 at a constant acceleration (speed C2 to C3, acceleration −A1), and a period R24 of increasing acceleration from negative value to approach "0" (speed C3 to C4, acceleration −A1 to −A0), and the accelerating operation during those periods (negative acceleration) allows a transition to a period R32 of rotating at a constant speed C4 without significant speed alterations. The period of decreasing the rotating speed further after that includes a period R25 of decreasing acceleration (speed C4 to C5, acceleration −A0 to −A1), a period R13 of rotating at a constant acceleration (speed C5 to C1, acceleration −A1), and a period R26 of increasing acceleration (speed C1 to "0", acceleration −A1 to −A0), and the accelerating operation during those periods (negative acceleration) pauses the rotating motion.

As shown in FIG. 10B, the setting of classification of acceleration/deceleration, the initial value of acceleration, the target count value and reference which are information on the timing of transition from the state of acceleration alteration using the initial acceleration table 1401b to the constant acceleration, the inflection point and inflection point reference which are information on the timing of transition from the state of constant acceleration using the speed table 1401a to the state of acceleration alteration, and the target count value which is information on the timing of retransition from the state of acceleration alteration to the state of constant speed are stored in the acceleration/deceleration setting 1402a to be stored in the register 1402 in accelerating. Addr (A0) indicates here the address corresponding to the acceleration A0 for the explanation and actually the value of the address is stored. The target count values C0 and C1 are not necessarily equal to the prescribed count given in the speed table 1401a.

In FIG. 10C, as in accelerating, the information on two points of transition between the speed calculation period using the acceleration table 1401b and the speed obtention period using the speed table 1401a, the setting of classification of acceleration/deceleration, the information on the initial acceleration and the ultimate target count value are retained individually in order of use. That is, in the image forming apparatus 1 in the present embodiment, both in accelerating and in decelerating, the speed calculation period, the speed obtention period, and the speed calculation period are set in order, and the operation of acceleration/deceleration ends at the ultimate target count value.

In the present embodiment, the next reference addresses cannot be all set beforehand, as the same range of acceleration alteration is employed twice from the opposite directions at each time of acceleration and deceleration. In this example, therefore, the address to be referred to next is determined sequentially based on the arrangement order, the information on the classification of acceleration/deceleration, the inflection point address, and the inflection point reference, without using the next reference address.

In such cases, the determining process by rewriting the acceleration/deceleration setting 1402a in the register 1402 and referring to the setting concerned sequentially enables easily the command to pause the accelerating operation at a constant acceleration in addition to the command to pause conveying in the rotating motion of the stepping motors 141a and 142a in the image forming apparatus 1 in the second embodiment, that is, the command to change the inflection point address and decrease the target count value so that the timing to obtain the command from outside before reaching the rotating speed indicated by the initial inflection point address (prescribed count) is the timing to switch from the constant acceleration control to the acceleration alteration contro Execution of such commands may be similarly triggered by an input operation of the prescribed command via the operation receiver 16, an interrupting signal in a case of detection of error by a sensor not shown in the drawings, and so forth.

FIG. 11 is a flow chart showing the control procedure of the acceleration/deceleration control process executed in the image forming apparatus 1 in the present embodiment.

In comparison to the acceleration/deceleration control process in the image forming apparatus 1 in the first embodiment, the process in steps S106, S125, and S127 is substituted respectively by the step S106a, S125a, and S127a in this acceleration/deceleration control process, and the processing order of the step S127a is replaced from that of step S127. The process of the step S130 is also added. The processing steps other than those are common, and the description thereof is omitted, while the numbering in the drawings is shared.

If "YES" is selected in the process of the step S105, the control circuit 1403 determines whether or not the next reference address is in the acceleration table 1401b (step S106a). If it is determined that the next reference address is in the acceleration table 1401b ("YES" in step S106a), the process of the control circuit 1403 moves on to the step S108. If it is determined that the next reference address is not in the acceleration table 1401b (but in the speed table 1401a) ("NO" in step S106a), the process of the control circuit 1403 moves on to the step S107.

If "YES" is selected in the process of the step S124, the control circuit 1403 determines whether or not the next reference address is in the acceleration table 1401b (step S125a). If it is determined that the next reference address is not in the acceleration table 1401b (but in the speed table 1401a) ("NO" in step S125a), the processing of the control circuit 1403 moves on to the step S128. If it is determined that the next reference address is in the acceleration table 1401b ("YES" in step S125a), the process of the control circuit 1403 moves on to the step S127a.

In the process of the step S127a, the control circuit 1403 determines whether the count set value is above the target count value or not (step S127a). If it is determined that the count set value is not equal to or larger than the target count value ("NO" in step S127a), the process of the control circuit 1403 moves on to the step S126. If it is determined that the count set value is equal to or larger than the target count value ("YES" in step S127a), determined is whether or not the target value is larger than the prescribed maximum value, for example, "7659" in this example which is the second largest value (motion slow) in the speed table 1401a (step S130).

If it is determined that the target value is larger than the prescribed maximum value ("YES" in step S130), the process of the control circuit 1403 moves on to the step S129. If it is determined that the target value is equal to or smaller than the prescribed maximum value ("NO" in step S130), the process of the control circuit 1403 moves on to the step S110.

As described above, in the image forming apparatus 1 in the third embodiment, the control circuit 1403 and the register 1402 may obtain the timing to switch between the period of determining the rotating speed according to the arrangement of the prescribed counts and the period of calculating and determining the rotating speed according to the arrangement of the acceleration set values.

In the image forming apparatus 1, even when the increase of the rotating speed of the stepping motors 141a and 142a is stopped abruptly outside the regular control, the rotating speed can be appropriately altered and controlled so that the situation is flexibly and easily handled and that a massive power is not applied to the rollers, belts, or the stepping motors 141a or 142a.

The control circuit 1403 and the register 1402 as obtainer obtain the timing for switching as an interrupting signal. The request for stopping increase of the rotating speed can be dealt with swiftly and appropriately as the command is obtained quickly by the interrupting signal outside the regular control.

The embodiments described above should not be construed to limit the present invention, and various modifications may be made to them.

For example, in the embodiments described above, the speed table 1401a is used in the period of rotating at a constant acceleration and the acceleration table 1401b is used in the period of altering acceleration. However, the present invention is not limited to those configurations in any way. For example, in the period in which the rotating motion starts from the pausing state and in the period in which the rotating motion moves on to the pausing state (periods R21 and R26 in FIG. 10A), the prescribed count may be set in the speed table 1401a. The period of rotating at a constant acceleration may be included in the acceleration table 1401b.

In the embodiments described above, the period of altering acceleration is set in transition sections before and after the rotating motion at a constant speed and at all beginnings and endings of each speed alteration period, for example. However, the present invention is not limited to such configurations in any way. For example, the period of acceleration alteration is set only in the period of altering the speed in accelerating, just to prevent the shocking to the roller and belt at the time of reading and image forming.

In each flow chart in the embodiments described above, the ending of the period of altering the acceleration is determined by whether or not the count set value reaches the target count value. However, the present invention is not limited to such configurations in any way. When the alteration amount of acceleration is specified in the period of altering the acceleration, it is possible to determine how many times the acceleration is altered. As shown in FIG. 6B, therefore, the period of altering the acceleration may end without checking the actual count set value, setting the next reference address in the acceleration table 1401b as address 20 in the speed table 1401a.

In the embodiments described above, the speed table 1401a and the acceleration table 1401b are commonly used for increasing and decreasing the speed. However, the present invention is not limited to such configurations in any way. For example, different tables may be used in a case where the acceleration is determined so that stepping out of the stepping motors 141a and 142a is not allowed in increasing and decreasing the speed while shocking to the roller and belt is allowed only in decreasing the speed to pause.

In the embodiments described above, multiple speed tables may be prepared according to multiple types of acceleration, but a speed table according to the minimum acceleration may be prepared to set the speed while skipping according to the set acceleration. However, in a case where the count value is used as the speed setting, an appropriate setting or calculation may be necessary in order to set a constant acceleration, because the count value includes not only information on speed but also information on elapsed time.

In the embodiments described above, the acceleration table 1401b is described as single, but a case where multiple are used is not excluded. However, the required storage of memory increases as the number of the acceleration tables 1401b increases, and eventually the present invention gets less effective. Thus, the number of the acceleration tables 1401b is less than that of the acceleration tables 1401a, and they are used commonly at least part of the acceleration/deceleration patterns.

In the embodiments described above, the rotating speed to be output is described as single. But when multiple rollers with different diameters on a conveying circuit of media to be conveyed are rotated, multiple rotating speeds corresponding to each roller can be set and output individually. The driving control signal may be set and controlled individually to multiple stepping motors which rotate multiple rollers in an identical form.

In the embodiments described above, the rotating speed of the stepping motors 141a and 142a is controlled according to the count of the clock signals at a prescribed frequency and the count is retained as a prescribed count in the speed table 1401a, but the count may be retained as a speed value in the speed table 1401a. The speed control may be executed not at each semi cycle of the driving signal but at prescribed intervals according to the range of speed control of the stepping motors 141a and 142a or such.

Combinations and exclusions of each controlling configuration in the three embodiments described above are possible as far as not being inconsistent with each other.

In the embodiment described above, described is the operation of controlling the rotating speed of the stepping motor in the present invention in the conveyer of recording media in the image forming apparatus of digital imaging system and the conveyer of documents to be read concerning the scanning function. However, the present invention is not limited to such configurations in any way. The image forming apparatus may be in other systems and the scanning device which does not form images may be used. The present invention may also be applied to a conveying apparatus which conveys components other than recording media or documents to be read.

In addition, the specific details such as the configurations, contents and procedures of the controlling and the like shown in the above described embodiment can be modified as needed within the scope of the present invention.

The entire disclosure of Japanese Patent Application No. 2017-103295 filed on May 25, 2017 including description, claims, drawings, and abstract are incorporated herein by reference in its entirety.

What is claimed is:

1. A rotating motion control apparatus comprising:
   a memory which stores an index value concerning a rotating speed of a stepping motor; and
   a hardware processor which determines the rotating speed of the stepping motor and controls operation of a driver which rotates the stepping motor according to the rotating speed; wherein
   the memory stores an arrangement of a speed index value and an arrangement of an acceleration index value, and
   the hardware processor controls the operation of the driver by combining a period of determining the rotating speed according to the arrangement of the speed index value and a period of calculating and determining the rotating speed based on the arrangement of the acceleration index value when the rotating speed is altered.

2. The rotating motion control apparatus according to claim 1, wherein the arrangement of the acceleration index value is used commonly to calculate the rotating speed with an arbitrary rotating speed as an initial value.

3. The rotating motion control apparatus according to claim 1, wherein
   the memory stores a plurality of types of arrangements of the speed index value according to a plurality of set accelerations, and
   the hardware processor determines each range to be used to calculate the rotating speed in the arrangement of the acceleration index value according to the set acceleration.

4. The rotating motion control apparatus according to claim 1, wherein the arrangement of the speed index value is used in a period of altering the rotating speed at a constant acceleration in a period of altering the rotating speed.

5. The rotating motion control apparatus according to claim 1, wherein the arrangement of the acceleration index value is used in a period of altering an acceleration in a period of altering the rotating speed.

6. The rotating motion control apparatus according to claim 5, wherein the period of altering the acceleration is individually set in at least one of a specific period after a beginning and a specific period before an ending of the period of altering the rotating speed.

7. The rotating motion control apparatus according to claim 5, wherein the hardware processor ends the period of altering the acceleration when the rotating speed sequentially calculated reaches a predetermined target speed in the period of altering the acceleration.

8. The rotating motion control apparatus according to claim 7, wherein, when the calculated rotating speed exceeds the predetermined target speed through alteration from a previous rotating speed, the hardware processor sets the rotating speed as the target speed.

9. The rotating motion control apparatus according to claim 1, wherein, when the rotating speed is increased and when the rotating speed is decreased, the hardware processor uses each of the arrangement of the speed index value and the arrangement of the acceleration index value commonly, and reverses an order to read out the index values in the arrangement.

10. The rotating motion control apparatus according to claim 1, wherein
the speed index value is a count of a clock signal at a predetermined frequency, and
the hardware processor rotates the stepping motor per unit angle with the driver each time a number of inputs of the clock signal reaches the count indicated by the speed index value.

11. The rotating motion control apparatus according to claim 1, wherein the memory stores the speed index value and the acceleration index value so as to be associated with information on an address indicating a memory location of a speed index value or an acceleration index value to be read out after the speed index value or the acceleration index value respectively.

12. The rotating motion control apparatus according to claim 1, wherein the hardware processor obtains, from outside, a timing of switching the period of determining the rotating speed according to the arrangement of the speed index value and the period of calculating and determining the rotating speed based on the arrangement of the acceleration index value in the period of altering the rotating speed.

13. The rotating motion control apparatus according to claim 12, wherein the hardware processor obtains the timing of switching as an interrupting signal.

14. The rotating motion control apparatus according to claim 1, wherein, when a command to stop a rotating motion of the stepping motor is obtained while the rotating speed is increasing, the hardware processor decreases the rotating speed after decreasing the acceleration of the rotating speed gradually to set alteration of the rotating speed to zero using the arrangement of the acceleration index value.

15. An image forming apparatus comprising:
a conveyer including the rotating motion control apparatus according to claim 1, the driver, and the stepping motor; and
an image forming operator which forms an image on a medium conveyed by the conveyer.

16. A method for rotating motion control, the method using a memory which stores an index value concerning a rotating speed of a stepping motor, determining the rotating speed of the stepping motor and controlling operation of a driver which rotates the stepping motor according to the rotating speed, wherein the memory stores an arrangement of a speed index value and an arrangement of an acceleration index value, the method comprising a rotating speed setting step of controlling the operation of the driver by combining a period of determining the rotating speed according to the arrangement of the speed index value and a period of calculating and determining the rotating speed based on the arrangement of the acceleration index value, when the rotating speed is altered.

* * * * *